(12) United States Patent
De Juan

(10) Patent No.: US 10,032,081 B2
(45) Date of Patent: Jul. 24, 2018

(54) CONTENT-BASED VIDEO REPRESENTATION

(71) Applicant: Yahoo! Inc., Sunnyvale, CA (US)

(72) Inventor: Paloma De Juan, New York, NY (US)

(73) Assignee: Oath Inc., New York, NY (US)

( * ) Notice: Subject to any disclaimer, the term of this patent is extended or adjusted under 35 U.S.C. 154(b) by 125 days.

(21) Appl. No.: 15/019,934

(22) Filed: Feb. 9, 2016

(65) Prior Publication Data
US 2017/0228599 A1    Aug. 10, 2017

(51) Int. Cl.
*G06K 9/00*   (2006.01)
*G06F 17/30*  (2006.01)

(52) U.S. Cl.
CPC ..... *G06K 9/00744* (2013.01); *G06F 17/3053* (2013.01); *G06F 17/30598* (2013.01); *G06F 17/30796* (2013.01); *G06F 17/30858* (2013.01); *G06K 9/00718* (2013.01)

(58) Field of Classification Search
CPC ............ G06K 9/00744; G06K 9/00718; G06F 17/3053; G06F 17/30598; G06F 17/30796; G06F 17/30858
See application file for complete search history.

(56) References Cited

U.S. PATENT DOCUMENTS

| | | | | |
|---|---|---|---|---|
| 8,571,850 B2* | 10/2013 | Li | ................. | G06F 17/241 382/224 |
| 2008/0205770 A1* | 8/2008 | Jia | ................. | G06K 9/4676 382/217 |
| 2010/0217755 A1* | 8/2010 | Vignoli | ............ | G06F 17/30743 707/706 |
| 2011/0314059 A1* | 12/2011 | Hu | ................ | G06F 17/30864 707/771 |
| 2012/0308121 A1* | 12/2012 | Datta | ................ | G06F 17/3028 382/155 |
| 2015/0262036 A1* | 9/2015 | Song | ................ | G06F 17/3002 382/159 |
| 2015/0356199 A1* | 12/2015 | Mei | ................ | G06F 17/30917 707/728 |
| 2016/0358628 A1* | 12/2016 | Liu | ................ | G11B 27/031 |
| 2017/0060870 A1* | 3/2017 | Checkley | ............ | G06F 17/3053 |

* cited by examiner

*Primary Examiner* — Yon Couso
(74) *Attorney, Agent, or Firm* — Martine Penilla Group, LLP

(57) ABSTRACT

Methods and systems for classifying a video include analyzing an image captured in each frame of the video file to identify one or more elements. Each element identified in the image of each frame is matched to a corresponding term defined in a vocabulary list. A number of frames within the video file in which each of the element that correspond to the term in the vocabulary list, appears, is determined. A vector is generated for the video file identifying each term in the vocabulary list. The vector is represented as a name-value pair with the name corresponding to the term in the vocabulary list and the value corresponding to number of frames in which the element matching the term appears in the video file.

14 Claims, 11 Drawing Sheets

Sample objects captured in the video file and corresponding terms in vocabulary list

| accordion | bird | croquet ball | golf ball | laptop |
|---|---|---|---|---|
| airplane | bookshelf | crutch | golf cart | lemon |
| ant | bow | cucumber | guacamole | lion |
| antelope | bow tie | cup or mug | guitar | lipstick |
| apple | bowl | diaper | hair dryer | lizard |
| armadillo | brassiere | digital clock | hair spray | lobster |
| artichoke | burrito | dishwasher | hamburger | maillot |
| axe baby | bus | dog | hammer | maraca |
| bed | butterfly | domestic cat | hamster | microphone |
| backpack | camel | dragonfly | harmonica | microwave |
| bagel | can opener | drum | harp | milk can |
| balance | car | dumbbell | hat with a wide brim | miniskirt |
| beam | cart | electric fan | head cabbage | monkey |
| banana | cattle | elephant | helmet | motorcycle |
| band aid | cello | face powder | hippopotamus | mushroom |
| banjo | centipede | fig | horizontal bar | nail |
| baseball | chain saw | filing cabinet | horse | neck brace |
| basketball | chair | flower pot | hotdog | oboe |
| bathing | chime | flute | iPod | orange |
| cap beaker | cocktail shaker | fox | isopod | otter |
| bear bee | coffee maker | french horn | jellyfish | pencil box |
| bell pepper | computer keyboard | frog | koala bear | pencil sharpener |
| bench | computer mouse | frying pan | ladle | perfume |
| bicycle | corkscrew | giant panda | ladybug | person |
| binder | cream | goldfish | lamp | piano |

Figure 5A

CONTENT-BASED VIDEO REPRESENTATION

BACKGROUND

Field of the Invention

The present disclosure relates to accurately representing content of a video file.

Description of the Related Art

Online video generation and consumption has been growing exponentially in recent years. The videos that are generated for consumption can be broadly classified into editorial content (i.e., content generated by content providers) and user generated content. Providing access to the massive corpus of video is becoming a huge problem to content providers or distributors, as there is lack of sufficient description of the content contained within. Accurate and comprehensive representation of video content would allow the video content to be matched to a search query and recommended to users, based on either the users' profiles or a purely content-based manner.

When users consume textual content, such as news content, a lot of information about the users interests can be gathered from the content that the users are exposed to, by analyzing the content using various techniques, such as Natural Language Processing (NLP) or entity linking (EL). However, for video content, it is hard to gather such related information as the only known information that is available to describe the video is metadata that is provided with the video content. Editorial video content usually comes with some tags and other forms of rich metadata. However, even with the tags and metadata, there is not sufficient information that can fully represent the video content. At most, the metadata provides titles, general description and some tags or categories associated with the video. With regards to user generated video content, even the little information that is available for the editorial content may not always be available for the user generated video content. This may be attributable to users not always describing the content they upload. When the users do describe the content, the strategy they follow to provide the information may not always take other users into consideration.

Lack of information for the video content results in the video content not being considered for recommendation to users. Video recommendation are generally done using collaborative filtering if sufficient information about the users viewing the video content can be collected. Unfortunately, information provided in the user profiles are sparse, and in some instances not available, especially for new users. The users, especially new users, need to be fully engaged, and providing good content recommendation is a good and powerful start.

Alternately or additionally, good video content recommendation can be done if sufficient knowledge of the video content is available. Similar to textual content, understanding the video content at a high semantic level allows one to learn more about the users' interests, which leads to better content recommendation, better advertisement targeting, and better advertisement placement. Better placement of advertisement may be effectuated by linking the advertisement to specific events happening within the video, if sufficient knowledge of the video content is available. Therefore, a comprehensive understanding of the video content allows for better content-based recommendation to users that include video content. A need therefore exists for improved methods and systems to provide an accurate depiction of actual content of the video files in order to build a true multimedia search system that includes the textual files as well as video files. The accurate depiction could lead to improved placement of context-relevant advertisement to right users at the right moment in the video file, and improved content recommendation for the users.

SUMMARY

The present disclosure describes methods and systems for accurately depicting content of a video file by identifying and representing each element identified within it in a textual format. The various implementations discussed herein define a video classification algorithm that is executed on a server computing device and is configured to analyze an image captured in each frame of a video file, identify various elements, such as objects, actions, scenes, events, etc., appearing in each frame of the video file, and generate a textual representation of the video file by interpreting the various elements appearing in the video file. The textual representation of the video file can be used to match the content of the video file to search query terms and to recommend video file content to users, based on their profiles or purely in a content-based manner.

This form of textual representation of a video file provides a detailed description of the actual content contained within the video file as the descriptive representation covers not only the video as a whole but also the content at a finer level. Extracting this kind of information is desirable for building a true multimedia search system, automatically associating different types of media, and showing context-aware relevant advertisements to the right users at the right moment. The detailed representation of the video file provides sufficient content-related information to determine users' content preferences so that content recommendations can be done using collaborative filtering of content. The detailed representation of content is much more exhaustive than information provided in metadata that usually comes with the video content. In some implementations, information provided in the metadata can be used to further augment the textual representation of the video file.

The textual representation of the video file is semantically rich. Metadata that typically accompanies a video file provides very limited representation of the content of the video file, and it misses out on the finer details contained within each frame. The textual representation bridges this information gap by identifying elements at the frame level and outputting a high-level semantic vector that are more aligned with query terms that are usually used in search queries. Elements identified in the high-level vector are unambiguous, as each element is accurately defined. For example, an apple fruit that is detected in a frame is actually identified as a fruit and not a name-brand computer. The elements are language-independent and can be product-oriented. The expressiveness of the textual representation of the video file can be made extensive and detailed, or narrow and limited by selecting an appropriate vocabulary list for identifying the various elements within the video file. For instance, a broad vocabulary list would ensure that the elements within the video file can be identified at a more detailed level, leading to the video file content to be matched and retrieved through generic queries. If the classification of the video file needs to address specific applications, such as advertisement targeting, then a narrower product-oriented vocabulary list may be used, with each term in the vocabulary list focusing on a type of term an advertising or promotional entity might be interested. The various elements identified in the video file need not have to be structured using any syntactic rules, as the purpose of identifying elements is to accurately depict the content contained within the video file and not to describe the video in natural language. Understanding the content of the video file using high semantic vector allows the video classification algorithm to learn more about users' interests at a granular level, so that better advertisements can be targeted or better content-based recommendations can be effectuated. It also drives better advertisement placement as the advertisements can be matched to specific events occurring in the video file so that the advertisement can be rendered when the specific events are triggered.

In some implementations, a method is disclosed. The method includes receiving a video file for classification. An image captured in each frame of the video file is analyzed to identify one or more elements. Each element identified in the image of each frame is matched with a term defined in a vocabulary list. A number of frames in which each element with a matching term in the vocabulary list, appears in the video file, is determined. A vector is generated for the video file. The vector identifies each term in the vocabulary list. The generated vector is represented in textual format as a name-value pair, wherein a name in the name-value pair corresponds to the name of the term in the vocabulary list. The value represents the number of frames in which each element corresponding to the matching term, appeared within the video file. Information provided in the vector is used to identify one or more frame numbers where the respective element is detected in the video file.

In some other implementations, a system is disclosed. The system includes a server computing device having a memory to store a video classification algorithm and a processor to execute logic of the video classification algorithm. The server computing device is configured to receive a video file and process the video file using the video classification algorithm. The video classification algorithm includes an image analyzer, a classifier and a vector generator. The image analyzer is used to analyze an image captured in each frame of the video file to identify one or more elements. The classifier is used to match the one or more elements identified in the image of each frame to corresponding terms within a vocabulary list and to determine a number of frames within the video file in which each element that corresponds to a term in the vocabulary list appears. The vector generator is used to generate a vector for the video file that includes each term in the vocabulary list. The vector generated by the vector generator is represented in textual format as a name-value pair. The name in the name-value pair corresponds to name of the term in the vocabulary list and the value corresponds to the number of frames within the video file in which each element corresponding to the term in the vocabulary list appears. Information provided in the vector is used to identify a frame number where the respective element is detected in the video file.

The various implementations thus provide a way to interpret content of a video file by identifying each and every element present in the video file and representing the identified elements in a meaningful way, such that the content of the video file can be searched and recommended to other users. This way of representing the video file provides more detail of the content contained in the video file than any metadata that is typically provided with a video file. The metadata, when available, usually provides a limited representation of the content of the video file, and it misses out on describing details at a finer level. The vector based textual representation is comprehensive, semantically rich, unambiguous, language-independent, and in cases where it is needed, can be refined to be more application-specific. The vector provides sufficient information that allows indexing of each element, making it possible to retrieve specific moments in the video file for matching to queries or other media content. In some implementations, the vector can be used to determine content similarity between two video files, for example.

Other aspects of the implementations will become apparent from the following detailed description, taken in conjunction with the accompanying drawings, illustrating by way of example the principles of the implementations.

BRIEF DESCRIPTION OF THE DRAWINGS

The disclosure may best be understood by reference to the following description taken in conjunction with the accompanying drawings.

FIGS. 5A-5C illustrate sample vocabulary list for matching various elements detected in of a video file, in accordance with some implementations.

DETAILED DESCRIPTION

Figure 1:
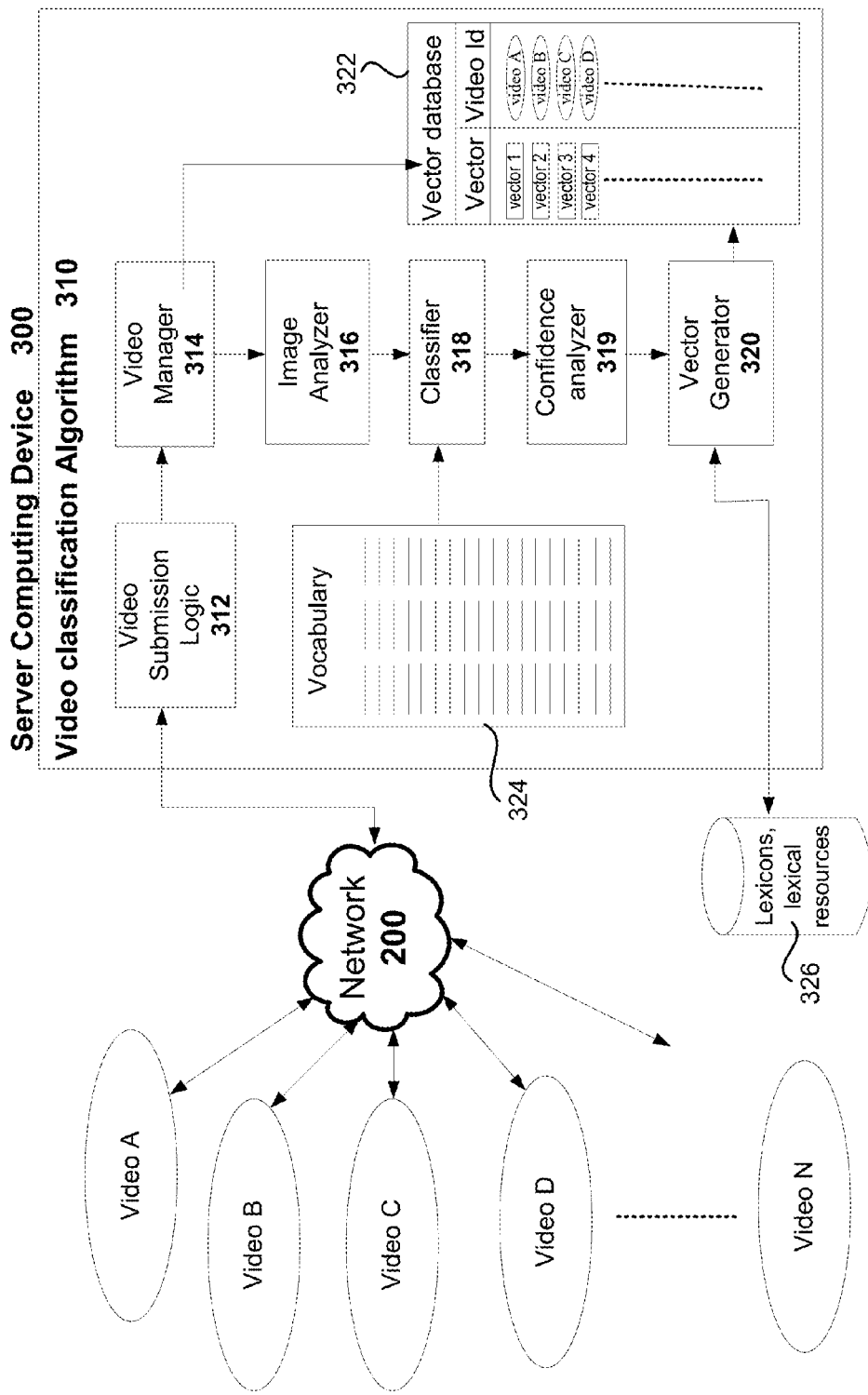
FIG. 1 illustrates a simplified overview of a system that is used to classify a video file, in accordance with some implementations.

The present disclosure describes methods and systems for representing a video file in a manner that provides detailed description of content in the video file. The accurate description of content of the video file is expressed in text formal to allow the video file to be searched and recommended to users. Knowledge of the actual content of the video file can also be used to identify and present relevant context-aware promotional media content at appropriate times within the video file, and such promotional media content may be presented to only those users that have expressed interest in such content. The textual representation allows the content of the video files to be matched with other forms of media content, including other video files, video advertisement, pictures, text document, other image files, etc. The detailed and accurate depiction of content in the video file can be used to understand users' content preferences (i.e., interests), leading to better content recommendation for the users.

The massive corpuses of video files that are available for user consumption include editorial content generated by content providers and user generated content. Some of these videos come with metadata that provide minimal description of the content of the video files. For instance, the metadata provided with the editorial content usually include some tags and brief description of content, but the brief description of content and the tags do not fully represent the content of these videos as they only provide a brief overview of the content and not the finer details. User generated content sometimes include metadata. However, the metadata provided by the users are not descriptive enough and do not always take other users into consideration. Usually the titles and tags provided by the users in the metadata are chosen so that they are easy to remember, or are geared towards driving user traffic toward the user generated content.

Various implementations are described herein to more accurately describe the actual content by identifying each element, such as objects, actions, scenes, events, etc., within a video file and representing the identified elements using a Vector Space Model. The description covers the video as a whole and at a fine level (e.g., at the frame level). Providing this level of detailed information in textual format enables the video file to be included as part of a true multimedia search system so that the video files can be identified and recommended to users in a manner similar to the presentation of text documents.

The accurate depiction of a video file is made possible by identifying frames in the video file, processing an image captured in each frame to identify elements, determining how long (i.e., how many frames) the different elements occur in the video file, matching each identified element with a corresponding term in a vocabulary list, and defining a vector representing the various elements identified within each frame. In some implementations, the vector may be broadened to include additional related terms that are inferred from one or more terms that match with element identified in the video file. The vectors are presented as name-value pairs, with the name corresponding to a term in the vocabulary list, and the value identifying a number of frames within the video file in which each element matching to the term in the vocabulary list, is detected. In some other implementations, the generated vector may be refined by determining weight of each element to the overall context of the video file using techniques, such as a Term Frequency Inverse Document Frequency (TFIDF) technique. In such implementations, the refining of the vector would include replacing the value in the name-value pair for each term that corresponds to an element in the video file with a corresponding TFIDF value. The refined vector is used for determining relevancy of the video file to search query terms, or for matching content of the video file to other media content.

In some implementations, depending on an application for which the video file is being classified, more than one vector may be associated with the video file. The vector includes information, such as frame numbers where each element appears. Such information may be used to index the content of the video file to easily identify of specific portion(s) of the video file where specific events or elements are detected. Identification of specific events or elements may be used for more precise advertisement targeting.

Representing a video file as a detailed vector has many advantages. For instance, it provides a semantically rich content-related data for the video file, which is a good substitute for the metadata that is sometimes provided with the video file. Metadata, when available, provides very limited representation of the content of the video file as it does not cover the finer detail of content captured in various frames within the video. In some instances, when a video file with the metadata is processed, the system only yields low-level features representing visual qualities of video and not the in-depth detail of content contained in each frame. The various implementations that will be discussed in detail in the following paragraphs, on the other hand, teach semantically rich vectors that identify the various elements contained in each frame of the video file. This level of in-depth element identification and video classification bridges the semantic gap existing between the metadata of the video file and the actual content contained in the video file. The high-level semantic vector generated for video files are more aligned with the kind of elements that are generally used in search queries.

These high-level semantic vectors are unambiguous, as each element (e.g., object, action, scene or shot, event, etc.) identified in the video file is definitively defined. The metadata, on the other hand, is ambiguous as it goes through natural language interpretation. The high-level semantic interpretation is language-independent. As a result, irrespective of which language is selected to render an identified element, the interpreted elements all map to the same element. The high-level semantic interpretation need not be structured. Depending on the application for which the semantic interpretation of the video file is being used, the extensiveness of the vocabulary list used for identifying the various elements within the video file can be tuned. For example, if video files are to be classified for retrieval through search queries, then a detailed vocabulary list may be more appropriate for representing content of the video file. If the video files are to be used for targeting advertisement, a limited vocabulary list may be more appropriate, wherein each term in the limited vocabulary list are more focused on the type of terms that are generally of interest to the advertisers.

A video file usually tells a story or provides details of an event. As a result, the story depicted in the video file may include one or more scenes. Each scene may include one or more shots. Each shot includes a set of frames that are temporally adjacent and visually coherent to a physical space in which the shot is captured and each scene includes one or more temporally adjacent shots that are contextually coherent. The set of frames captured in each shot may capture one or more actions, or one or more objects. For example, the video file may include a kitchen scene. The kitchen scene may be captured from different angles or from different locations within the kitchen, with frames captured at each angle or location defining a shot. Various actions, such as baking, cooking, washing dishes, etc., may be captured in the kitchen scene. Similarly, various objects, such as stove, oven, sugar container, coffee machine, dishes, utensils, etc., may also be captured. The video classification algorithm analyzes each frame captured in the video file to identify various elements (i.e., objects, actions, scenes, events, etc.) and generate a comprehensive semantic vector by matching the identified elements to corresponding terms in a vocabulary list. The terms identified in the semantic vector generated for the video file need not have to be tied together using syntactic rules. Although structuring the various elements can be arranged into actual sentences, resulting in better performance, such structuring is not needed as the identified elements provide sufficient detail of the content of the video file. In other words, the high-level semantic vector provides a more comprehensive interpretation of content of video files than what can be determined by just analyzing audio-visual features.

With a brief overview of the disclosure, specific implementations will be described in detail with reference to the various drawings.

FIG. 1 illustrates a simplified overview of a system used in classifying the video file, in some implementations. The system includes a server computing device 300 on which a video classification algorithm 310 is provided. The server computing device 300 can be part of an application cloud system, or part of a network of servers associated with a content provider, content distributor or content generator. The network of servers could be part of a local area network, a wide area network, private area network, a corporate network, metropolitan area network, etc. The video classification algorithm 310 is used to identify frames of a video file, analyze images provided in the different frames of the video file, interpret the content contained within the images, and represent the content of the video file in textual format.

Typically, the video files (e.g., video a, video b, video c, video n) that are received for classification, can be generated and/or provided by a plurality of sources and may include editorial content provided by content generators, content providers, etc., or user generated content. The video file provided by a content source is received over a network 200, such as the Internet, and provided to the video classification algorithm 310 executing on the server computing device 300. The video classification algorithm 310 includes a plurality of modules that are used to receive the video file and process the content contained within to generate a comprehensive vector identifying the various elements identified in the video file. Examples of the modules of the video classification algorithm 310 that are used in processing the video file include video submission logic 312, a video manager 314, an image analyzer 316, a classifier 318, a confidence analyzer 319 and a vector generator 320. The video classification algorithm 310 may also refer to a vocabulary list 324 and one or more lexicons or lexical resources 326 in order to match terms to various elements identified within the video file or infer other related terms for one or more of the terms representing the identified elements. The identified elements are used to generate a vector that represents the content in a textual format. The generated vector for a video file is stored in a vector database 322 and used in matching the video file to other media files, understanding users' interests and preferences in content, and for retrieving the video file or portions of the video file in response to search queries. In some implementations, the vector database 322 includes the video file and the associated vector. In alternate implementations, the vector database 322 may include a video file identifier, a link to the video file and the associated vector so that video file content can be retrieved using the vector and the corresponding video file identifier.

When a video file is received at the server computing device 300 from a content provider, content generator or a user, the video file is forwarded to the video submission logic 312. The video submission logic 312 performs an initial process of the video file. As part of initial processing the video file, the video submission logic 312 may, in some implementations, verify the authenticity of the video file. For example, the video submission logic 312 may ensure the video file is from reliable source, in a format that is compatible for processing, and does not include any unauthorized, defective, malware or unwanted content. The video submission logic 312 also verifies to see if any metadata is provided with the video file. After initial verification of the video file, the video file with any metadata is forwarded to the video manager 314 for further processing.

The video manager 314 manages the video files received from various sources. As part of managing, the video manager 314 determines the file identifier of the video file and queries the vector database 322 to determine if the video file was already processed. If the video file was already processed, the vector database 322 would already have a copy or link to the video file and an associated vector. In such a case, the video file may still be processed to determine if the vector representing the video file is still valid or if any changes need to be made to the vector. Changes to the vector may be necessitated if there are any changes to the content of the video file, including additions, deletions, alterations made to the content. Alternately, if the video was already processed, the video manager 314 may not do any further processing. If the video file has not yet been processed, the video manager 314 updates the vector database 322 to include a copy of the video file or a link to a copy of the video file. The vector database 322 is a repository that includes a copy of the video files or links to the video files that were received and processed by the video classification algorithm 310. As and when a vector(s) is generated for the video file by other modules of the video classification algorithm 310, the generated vector is updated to the vector database 322 and associated with the video file using the video file identifier. The video file content is provided as input to the image analyzer 316.

The image analyzer 316 includes logic to identify a number of frames contained in the video file and analyze an image captured in each frame to identify one or more elements contained therein. Some of the elements that may be identified by the image analyzer 316 include an object, an action, a scene, or an event. The list of elements identified is not exhaustive and may include additional elements. In some implementations, the image analyzer 316 may analyze each and every frame in the video file to identify the various elements contained within the image captured in each frame. In some alternate implementations, the image analyzer 316 may use only a subset of frames from the video file to analyze. In such implementations, the image analyzer 316 may select one or more frames selected at periodic intervals from the video file to generate the subset. For example, the image analyzer 316 may identify 1 frame in every 5 frames to include in the subset. Alternately, 5 consecutive frames out of every 30 frames may be identified to be included in the subset. Once the subset is identified, the logic in the image analyzer 316 is used to identify the various elements captured in the images in the respective frames in the subset. It should be noted that objects can be identified from each frame whereas as actions can be identified by comparing images of multiple frames. The image analyzer includes the appropriate logic to perform image to image comparison of multiple frames in order to detect an action. The various elements identified in each frame or a subset of frames of the video file are then provided as input to the classifier 318 for further processing.

The classifier 318 receives the input information provided by the image analyzer 316 and performs a matching process. As part of the matching, each element identified by the image analyzer 316 is matched to a corresponding term defined in a vocabulary list 324. The vocabulary list 324 may include an exhaustive list of elements that are generally captured in different videos. Even with such an exhaustive list, not all elements identified by the image analyzer 316 may be included in the vocabulary list 324. This does not mean that the identified element is incorrect. It may just mean that the vocabulary list 324 is not exhaustive enough to include a corresponding term for the element. In such cases, the element that does not find a match in the vocabulary list 324 may not be included in the generation of the vector for the video file.

Figure 5B:
Figure 5C:

Some types of elements that may be included in the vocabulary list 324 include an object, an action, a scene, an event, etc. Example sample of terms that correspond to different types of elements that are captured in a video file are provided in FIGS. 5A-5C. For example, a sample list of objects captured in the video file for which corresponding terms are included in the vocabulary list 324 is provided in FIG. 5A. An example list of objects with matching terms in the vocabulary list 324 can be found in http://image-net.org/challenges/LSVRC/2014/browse-det-synsets. A sample list of actions captured in the video file for which corresponding terms are included in the vocabulary list 324 is provided in FIG. 5B. An example list of actions with matching terms in the vocabulary list 324 can be found in http://crev.ucf.edu/data/UCF101.php. A sample list of scenes that may be captured in the video file for which corresponding terms for the scenes are included in the vocabulary list 324 is provided in FIG. 5C. An example list of scenes with matching terms in the vocabulary list 324 can be found in http://places.csail.mit.edu/browser.html. Similar list may be provided for identifying various events that are generally captured in the video file. Of course, the example lists provided herein include only a sampling of the objects, actions and scenes for which matching terms can be found in the vocabulary list 324, and that other lists may be used to define matching terms in the vocabulary list 324.

In some implementation, the vocabulary list 324 may include multiple sets of vocabulary. For example, a first set of vocabulary may be an exhaustive list of terms that correspond to elements that are generally captured in each frame of a video file, and a second set of vocabulary may include a limited list of terms corresponding to certain ones of elements captured in each frame of a video file. Providing different sets of vocabulary list may allow the classifier 318 to perform the different levels of classification of a video file. The level of classification may be dictated by type of application for which the video classification is being used. For example, the limited set of vocabulary may be used for product-oriented classification to target advertisement while the exhaustive list of vocabulary may be used for a more comprehensive description of content of the video file for query related classification. Using appropriate set of vocabulary list may prevent unnecessary over-classification or under-classification of a video file.

Once the elements detected in image of each frame are matched to corresponding terms in the vocabulary list, the classifier 318 may determine number of occurrences (i.e., number of frames) of each element in the video file for which a matching term was found in the vocabulary list. In addition to identifying number of occurrences, frame number(s) (i.e., time stamp) of each frame in which each of the elements was detected is also identified. The detailed information (matching term, number of occurrences, and frame numbers) of each element detected in the video file is forwarded to a confidence analyzer 319.

The confidence analyzer 319 determines the various elements detected in each frame and computes a confidence score for each element detected in each frame. The confidence score for each element identified in each frame of the video file is computed based on the amount of confidence that the element is depicted in the picture. For example in a kitchen scene, the confidence score of a microwave oven being depicted will be higher than in a bathroom or garage scene. Similarly, the confidence score of a washer being depicted in a laundry room scene is much higher than in the living room scene. In another example, a frame captured from a living room may include an image of a car. This may be the case when a person capturing the video of the living room has a view of a street through a window and captured the car parked outside. In such a case, the confidence score for the car being depicted in the living room scene will be lower than the confidence score of other elements (i.e., objects, actions, events) identified in the living room. The confidence score computed for each element is used by the vector generator 320 to refine the vector generated for the video file.

In some implementations, the confidence score computed by the confidence analyzer 319 is defined to be a value between 0 and 1. Based on the computed confidence score, the confidence analyzer 319 may filter out elements with confidence score that is below a pre-defined threshold value. For example, the pre-defined threshold value may be set at 0.5 (i.e., 50%) or 0.8 (i.e., 80%) and elements with confidence score below 0.5 or 0.8 may be automatically filtered out from the list of elements.

The computed confidence scores of each element provided by confidence analyzer 319 along with other information provided by the classifier 318 are forwarded to the vector generator 320 as input. The vector generator 320 generates a vector for the video file. The vector is one-dimensional vector includes a plurality of "slots" or placeholder for each term that appears in the vocabulary list. Each slot is represented in a name-value format, with the name corresponding to the term description and the value corresponding to number of frames that an element matching to the term, appears within the video file. Where a term does not match to any element detected in the video file, the number of frames will be zero and where a term matches to an element detected in the video file, the value will be non-zero.

Once the vector is generated for the video file, the vector generator 320 may, in some implementations, perform some post-processing operations to further refine the vector. For example, as part of post-processing operation, the vector generator 320 may validate existing terms that match to specific elements identified in each frame of the video file and refine the vector accordingly. In some implementations, the vector generator 320 may, for example, use the confidence score to perform contextual filtering of terms from the vector. For example, where a kitchen, food, cooking and a tractor were detected in a particular frame, it can be inferred from the confidence score of each element in the particular frame that the term tractor does not belong to the scene. Consequently, the vector generator 320 may remove the term from the vector. This type of filtering out the elements based on confidence score would result in a higher precision classification of the video file as elements that were incorrectly identified or that were irrelevant to the context captured in the frames may be purged. Of course, there is a potential that such refining of elements may result in removing some relevant elements that have lower confidence scores. In order to avoid filtering out relevant elements, additional logic may be included in the video generator 320 to ensure that elements that are contextually relevant but appear less frequently are retained and not discarded.

The vector generator 320 may also infer new terms from one or more other terms in the vector and include such new terms in the vector generated for the video file. For the above example, if, on top of the terms (kitchen, food, cooking), additional terms, such as flour, eggs, and sugar, are identified for the frame, then the logic within the vector generator 320 may infer that the scene captured is a kitchen scene and that a baking action is being captured in the particular frame. Accordingly, the inferred baking action term is included in the vector generated for the video file and the number of frames for such action corresponds to the number of frames in which the objects related to the baking action are detected. The additional term(s) that are inferred may correspond to same type of elements identified in the frame(s) (e.g., objects being inferred from other objects detected in a frame) or may be of different type (e.g., action(s) being inferred from one or more objects detected in a set of frames).

In some implementations, the vector generator 320 may identify and include additional terms that are related to terms matching to elements found in the video file. For example, the vector generator 320 may use one or more lexicons or lexical resources 326, such as WordNet®, etc., to broaden some of the terms identified in the vector of the video file. The expansion of the elements may include identifying and including holonyms, hypernyms or meronyms, for example, for specific ones of the terms in the vector of the video file. For example, if some of the terms found in the vector with matching elements (e.g., objects) of the video file include one or more of a crow, a pigeon, a sparrow, a robin, etc., then the lexical resources 326 may be used to include a broader term, such as bird, in the vector of the video file. Similarly, when the elements in the video file include one or more of a poodle, a German shepherd, Rottweiler, etc., then the lexical resources 326 may be used to include a broader term, such as dog, in the vector of the video file. Hypernym defines a word with a broad meaning that more specific words fall under (i.e., superordinate). In other words, hypernyms represent a parent concept in a relationship. For example, color is a hypernym for red, yellow, blue, etc. From the above example of poodle, etc., dog is a hypernym for poodle, German shepherd, Rottweiler, etc. Holonym defines a relationship in which a particular element denotes a part or a member of a whole. In other words, holonyms represent an upper concept in a part of a relationship. For example, body is a holonym for arm which is a holonym of elbow. A meronym defines a relationship in which a particular element is a part of a whole. For example, a bark is a meronym of tree which is a meronym of forest. Similarly, elbow is a meronym of arm which is a meronym of body.

The generated vector provides sufficient detail for indexing specific scenes or shots or trigger event of a video file. This form of representing the video file as a vector using a Vector Space Model, allows the vector to be searched or matched in a manner similar to a text document. This vector can be further processed to reflect relevance of each term to the video file with respect to the collection of video files. Further processing can be achieved by replacing the value of each term in the vector with a corresponding Term Frequency Inverse Document Frequency (TFIDF) value. The TFIDF value is computed as a relevance factor of each term, based on the frequency of its appearance in the video file versus number of files or documents in which the term appears. The size of the vector is reflective of a size of the vocabulary list that is used in classifying the video file. The generated vector is updated to the vector database 322 and associated with the video file using the video file identifier. The textual representation of the content of the video file can be used for matching the content to other media content and for targeting advertisement or other promotional content to specific areas or specific trigger events occurring in the video file.

Figure 2:
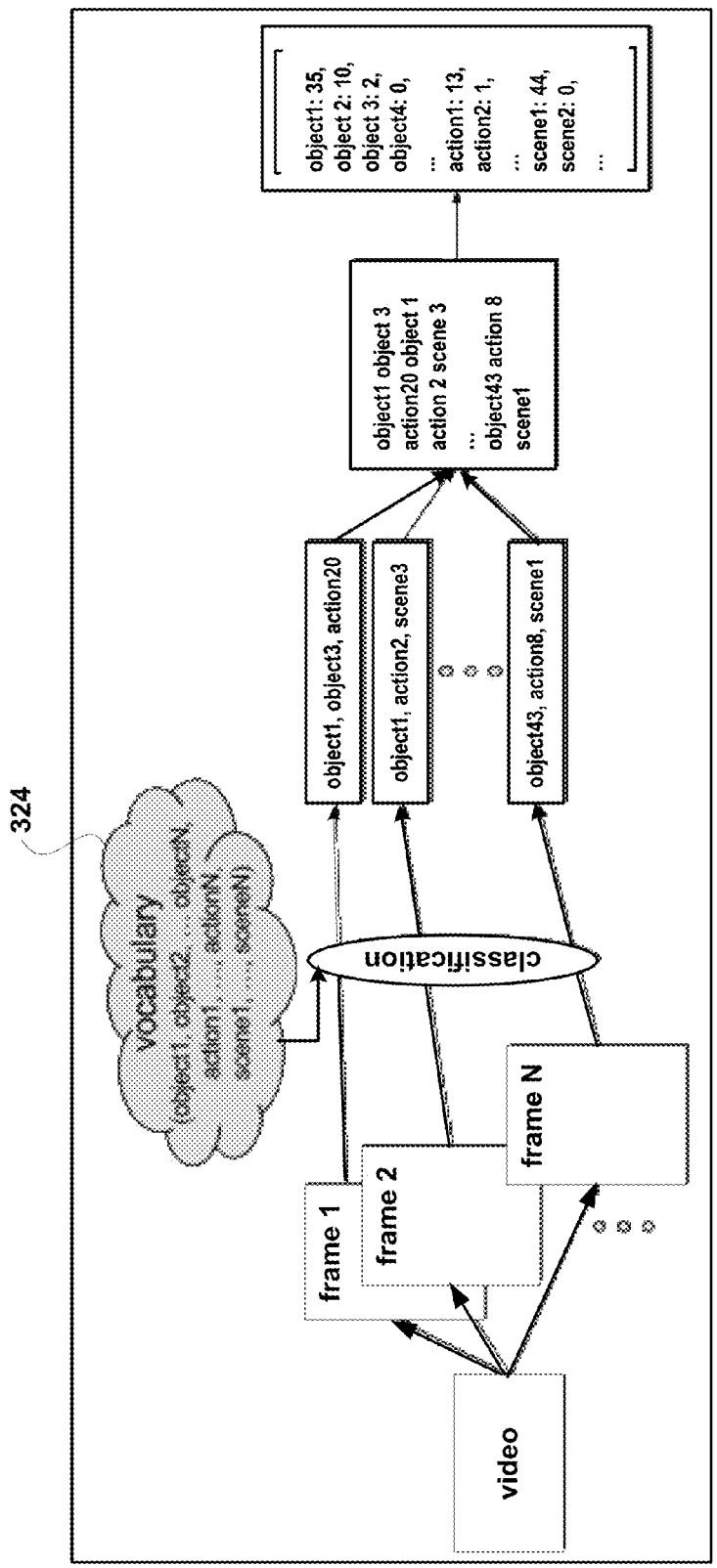
FIG. 2 illustrates an example process flow followed for generating a textual representation of a video file, in accordance with some implementations.

FIG. 2 illustrates an example process flow for classifying a video file, in one implementation. As shown, the video is made up of a number of video frames, frames 1 . . . frame N. In some implementations, the video classification algorithm described with reference to FIG. 1 is used in partitioning the video file into frames and analyzing image of each and every frame in the video file to identify the elements contained therein. The elements are matched to terms in a vocabulary list 324. For example, the elements that are identified in frame 1 may include object1, object3, and action20. Similarly, elements identified in frame 2 may include object1, action2, scene3, and so on. The elements identified in each frame are consolidated together into a single list. The consolidated list identifies all the elements that have been identified in the video file as a whole and number of frames in which each of the identified element are detected. Each element in the consolidated list is then matched with a corresponding term in a vocabulary list 324. Where a match is found, the value of the term is non-zero and corresponds to number of frames in which the element was detected. Where a match is not found, the value of the term is set to zero. Once all the elements are matched, the vector for the video is generated. The generated vector is a single dimension vector that may include terms with zero values and other terms with non-zero values. The generated vector may be refined further by filtering specific terms based on the respective confidence scores so as to generate a high precision textual representation of the content of the video file. This textual representation can be used for matching the content of the video file to other media files.

Figure 3:
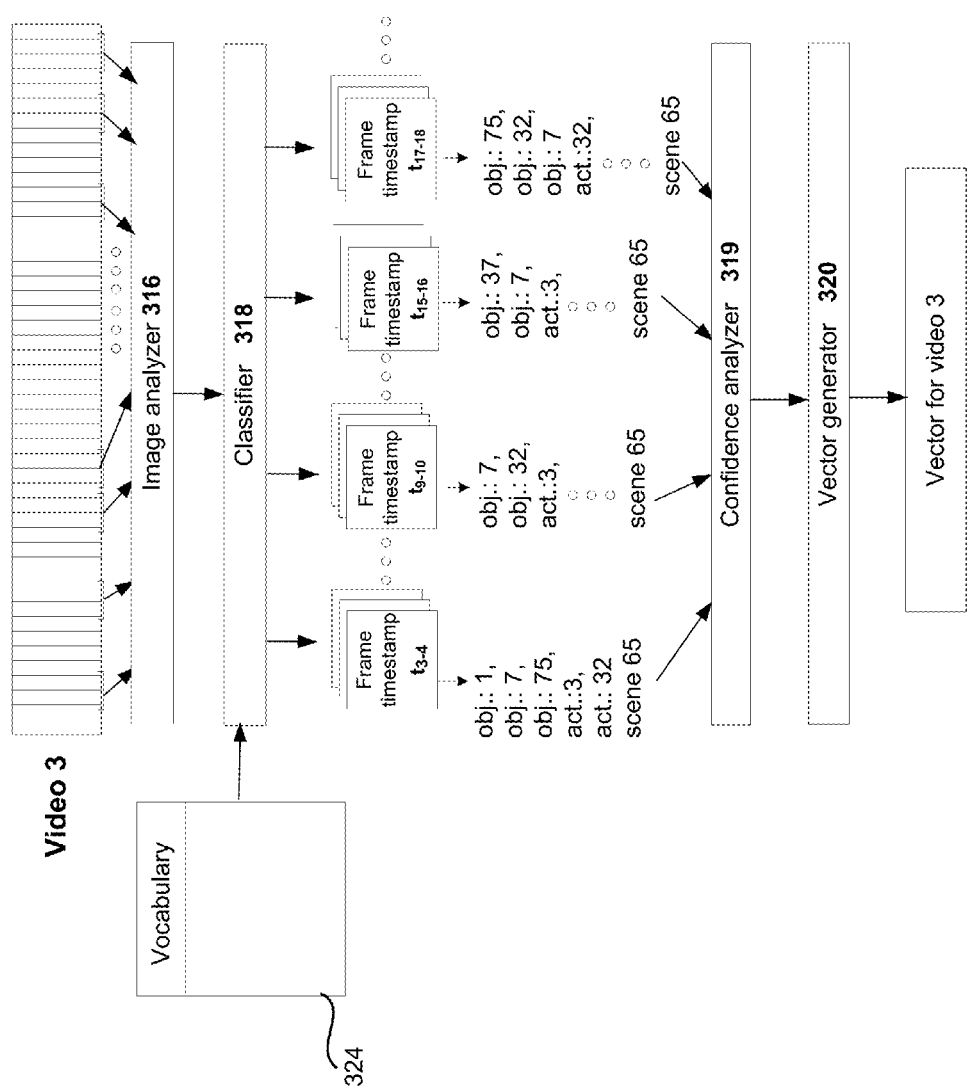
FIG. 3 illustrates an example vector generated for a video file, in accordance with some implementations.

FIG. 3 illustrates an example process used in classifying video file that identifies the role played by each module of a video classification algorithm in generating a vector for the video file, in some implementation. When a video file is received at the server computing device executing a video classification algorithm, the video file is processed to generate a vector. As part of classification, the various frames of the video file are identified by an image analyzer 316. The image analyzer 316 may examine all the frames identified in the video file to identify elements or may select a subset of frames to identify elements. The subset of frames is selected such that when the vector is generated, the vector provides a fairly detailed representation of the video file. In the implementation illustrated in FIG. 3, a subset of frames that fairly represents the video file is identified for processing. The subset of frames may include one or more frames selected at periodic intervals from the video file. Alternately, the subset of frames may include one or more frames of the video file selected at periodic intervals, wherein the frame(s) are selected based on amount of payload detected in the frames. The selected frames in the subset are processed by the image analyzer 316 to identify various elements.

The elements identified by the image analyzer 316 are used by the classifier to find terms from a vocabulary list 324 that match with the respective ones of the elements. Based on the processing, the classifier may identify terms that match objects 1, 7, 75, actions 3, 32 and scene 65 detected in frame numbers 3 and 4. The number of the elements identified from the frames corresponds to the extensiveness of terms in the vocabulary list 324. An object or a scene may be identified in each frame while an action may be identified using multiple frames. Further, the classifier 318 may not find a matching in the vocabulary list 324 for some elements that are detected by the image analyzer 316. As a result, these elements may not be included during the generation of the vector for the video file.

Each element identified in the video file that matches to a corresponding term in the vocabulary list 324, is provided to a confidence analyzer 319. The confidence analyzer 319 examines the elements in the context presented in the images of the respective frames and computes confidence scores for the elements. The confidence scores for the elements may be used by the vector generator 320 to refine the elements identified for the video file before a vector is generated for the video file, in some implementations. In other implementations, the confidence scores of the elements may be used by the vector generator 320 to refine the terms in the vector after the vector is generated for the video file. The vector generator 320 receives the elements identified by the image analyzer 316 and processed by the classifier 318, confidence analyzer 319, and generates the vector that represents each term in the vocabulary list in a name-value format with name corresponding to each term in the vocabulary list and the value corresponding to number of frames an element that matches with the term, is detected in the video file. Not all terms in the vocabulary list are found in the video file. As a result, the generated vector may have zero values for certain ones of the terms that do not have matching element in the video file. The size of the vector generated for the video file is the size of the vocabulary list used.

During post-vector generation processing, in some implementations, the size of the vector may be trimmed by eliminating the terms in the vector that have zero values. The vector size may be further reduced by filtering terms with confidence scores that are below a pre-defined threshold value. In alternate implementations, the vector generated with all the terms in the vocabulary list may be kept as is. In such implementations, the terms within the vector may be weighted based on the confidence score of each term, the value associated with each term, or both the confidence score and the value associated with each term. The weighting of the terms in the vector may be used to organize the terms in the vector in the order of relative weight. The relative weight may be used during matching of the video file with other media files, for example. The refined vector provides an accurate depiction of the actual content of the video file and the representativeness and relevancy of each element identified in it.

Figure 4:
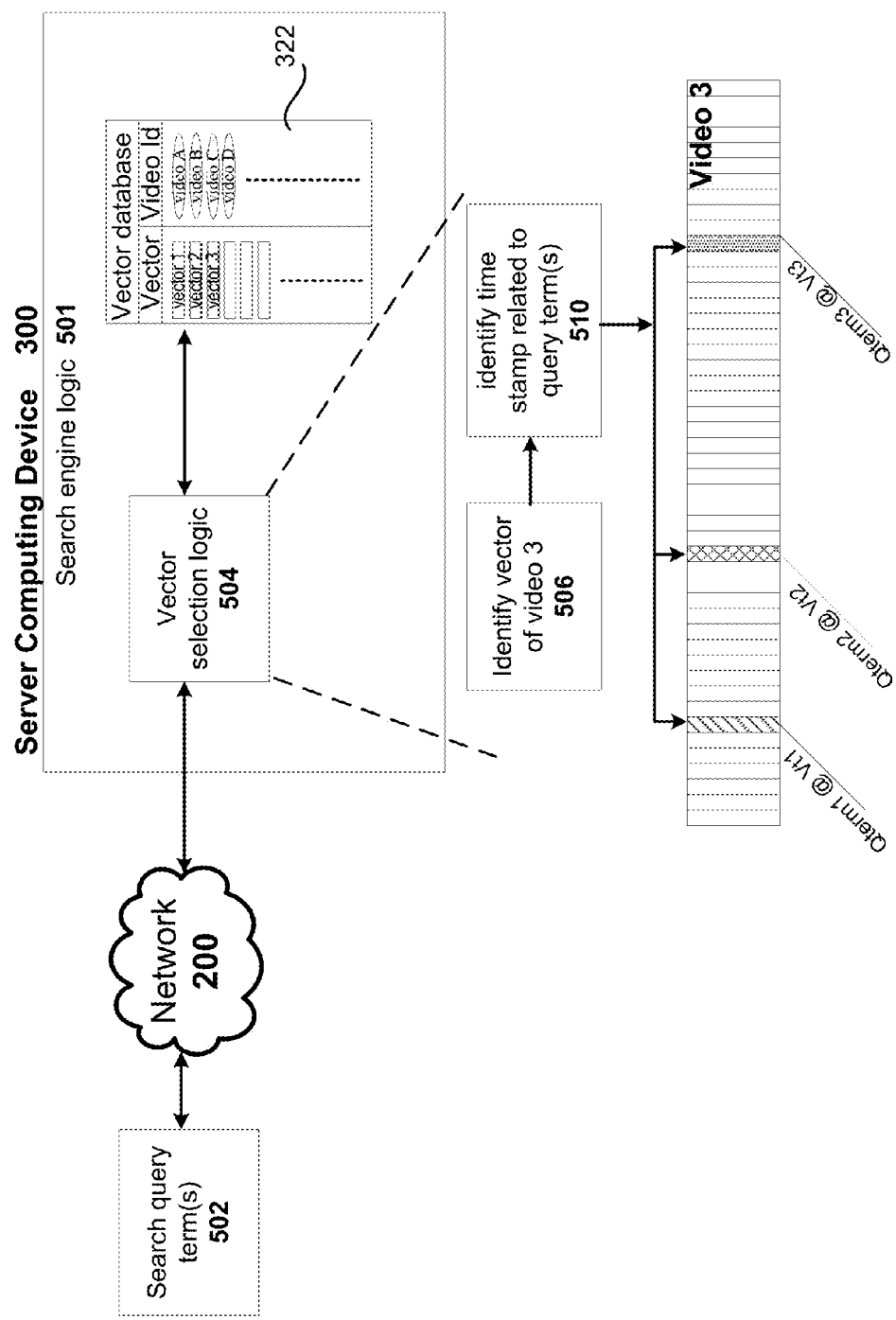
FIG. 4 illustrates an overview of a server computing device executing search engine logic for matching search query terms with video files, in accordance with some implementations.

FIG. 4 illustrates an example process flow for matching content of a video file to a search query, in some implementations. When a search query having one or more query term(s) 502 is received at a server computing device 300, the search engine logic 501 executing on the server computing device 300 searches various documents to identify documents that include the search query term(s). The search engine server may be a server computing device that also executes the classification algorithm or may be a different server that has access to the vector database 322 that includes information about the classified video files. The search engine 501 may use the search query term(s) to identify number of documents that most use the query term(s) as well as to identify a specific document. To enable finding a match of the search query term to the document, a search engine logic 501 executing on the search engine server 300 first converts the search query term into a search query vector. The search engine server 300 then uses the search query vector to find a match with vectors associated with documents (textual and video documents). The most relevant document could be a video file whose vector matches the search query vector.

The process of matching a search query to a document with the search query 502 being received at a server computing device 300. A vector selection logic 504 receives the query vector for the search query provided by the search engine logic 501, and queries a number of content databases, including the vector database 322 in which vectors of classified video files are maintained, to find documents whose content term(s) match the query term(s) defined by the query vector. Based on the querying, the vector selection logic 504 may identify a video file, video V3, whose vector matches the search query vector, as illustrated in box 506. Information provided in the vector, such as time stamp of frames provided by frame numbers, may be used as an index to identify a specific portion, such as a scene or a shot, within the video file where the query term appears. The index can be used to extract the specific portion or to provide an indicator at the specific portion matching the query term of the search query. FIG. 4 illustrates a simple example wherein the index identifies specific portions of the video file where the query term(s) appears. As illustrated, where more than one query term is used in the search query, it can be seen that query term 1 appears in frame represented by frame number Vt1, query term 2 appears in frame represented by Vt2, and so on. Alternately, if the search query includes only one query term, the video file may provide appropriate indicators to specific portions of the video file where the query term appears. The video file with appropriate indicators to specific portion(s) of the video file V3 can be returned as a search result, in response to the search query.

Additionally or alternately, the matching of the query term to specific content in the video file V3 can be used for targeting advertisement or other promotional content. An ad placement service may use information provided in the vector of video file V3 to determine specific content of the video file and use it to target an advertisement. Information provided in the vector may identify a trigger event that is occurring in a portion of the video file V3. The trigger event in the specific portion may be related to an action, such as a man drinking a bottle of water or coke from a coke can. The ad placement service may provide an advertisement for inclusion in the specific portion of the video file based on the context of the content or the trigger event. The content provider may use the time stamp information provided in the vector to identify the portion of the video file where the specific trigger event is occurring and integrate the advertisement into the portion of the video file. In some implementations, the integration may include associating the advertisement to the frame defined by the video time stamp so that when the video is played, the advertisement is presented as an overlay or in a pop-up window. Alternately, the advertisement may be integrated into the video file at the appropriate portion so that the advertisement is rendered alongside the content of the video file and during the occurrence of the specific trigger event. The integration may be performed so that the advertisement may be rendered at the beginning of the trigger event, during the trigger event, or at the end of the trigger event.

Figure 6A:
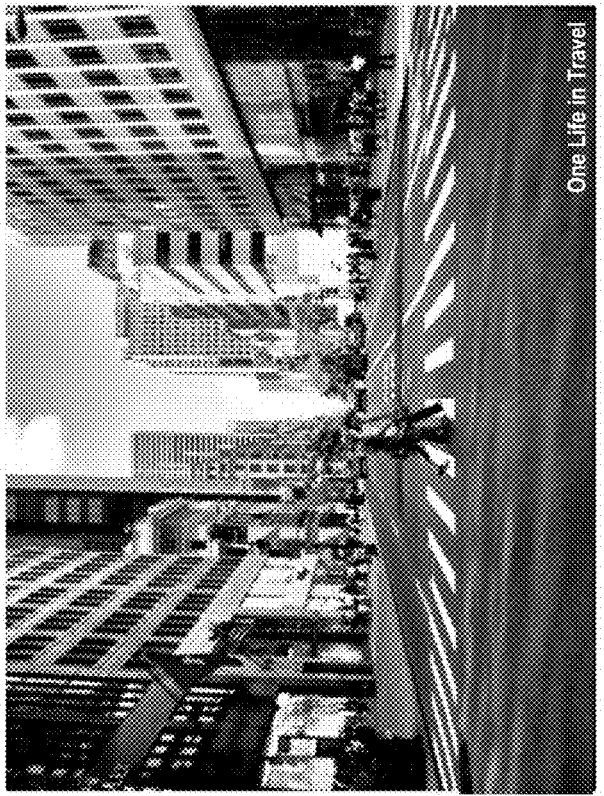
FIGS. 6A-6B illustrate examples of various elements that are identified in a photo and the corresponding confidence scores, in accordance with some implementations.
Figure 6B:
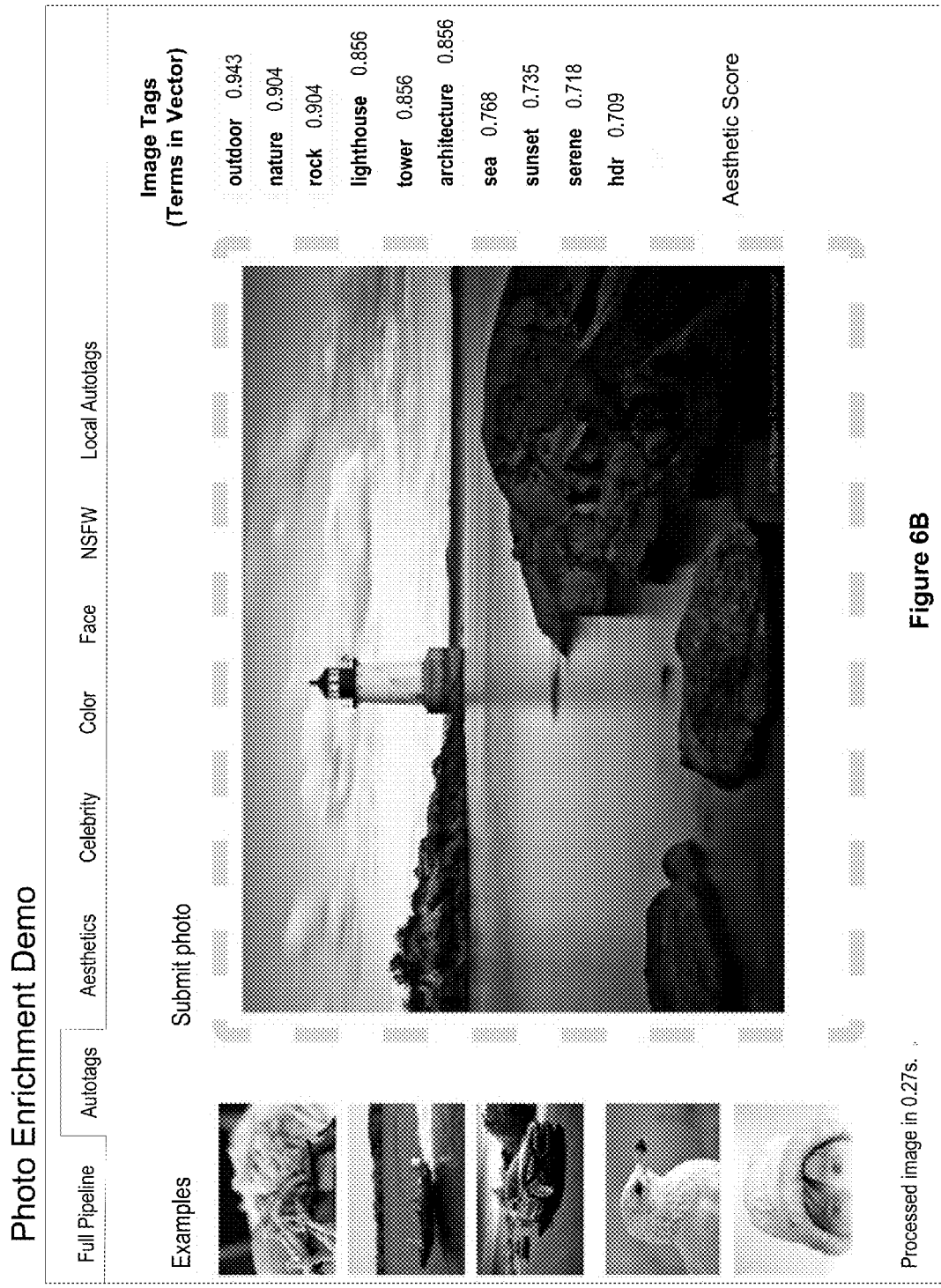

FIGS. 6A and 6B illustrate example pictures that can be classified using the classification algorithm, in some implementation. The classification algorithm identifies various elements, such as objects, actions, etc., that were identified by analyzing the respective images provided in the two pictures. A vector is generated for the picture that includes terms found in the vocabulary list including terms that match with the identified elements. The generated vector may further be classified in accordance to the confidence score computed for each identified element. Some of the terms from the vector and the corresponding confidence scores identified for the images presented in FIGS. 6A and 6B are shown under "Image Tags" section. The terms that are presented in the "Image Tags" section correspond to elements that have found matching terms in the vocabulary list for the identified elements. It should be noted that the terms that are rendered alongside the picture identifies only some of the terms that have confidence score that is at least greater than 0.75 (i.e., 75%). The vector generated for the pictures presented in FIGS. 6A and 6B includes additional terms from the vocabulary list that are not presented alongside the picture, wherein the additional terms may or may not correspond to elements identified in the pictures. The vectors generated for the two images are associated with the pictures within the vector database 322 using respective picture identifiers. Just as the case may be with the video file, the comprehensive vectors of the pictures are used in matching the image content to search queries or to match with other content, including video content, textual content, etc. Thus, the various implementations may be used to not only generate a comprehensive vector for a video file but can be extended to identifying content of any image file.

It should be noted that the vectors associated with the video files and pictures can be used to determine content similarity between any two images, between a video file and an image, an image and a text document, between any two video files, between the video file and text document, between videos and queries, etc. With the details of the various implementations, a method for classifying a video file will now be discussed with reference to FIG. 7.

Figure 7:
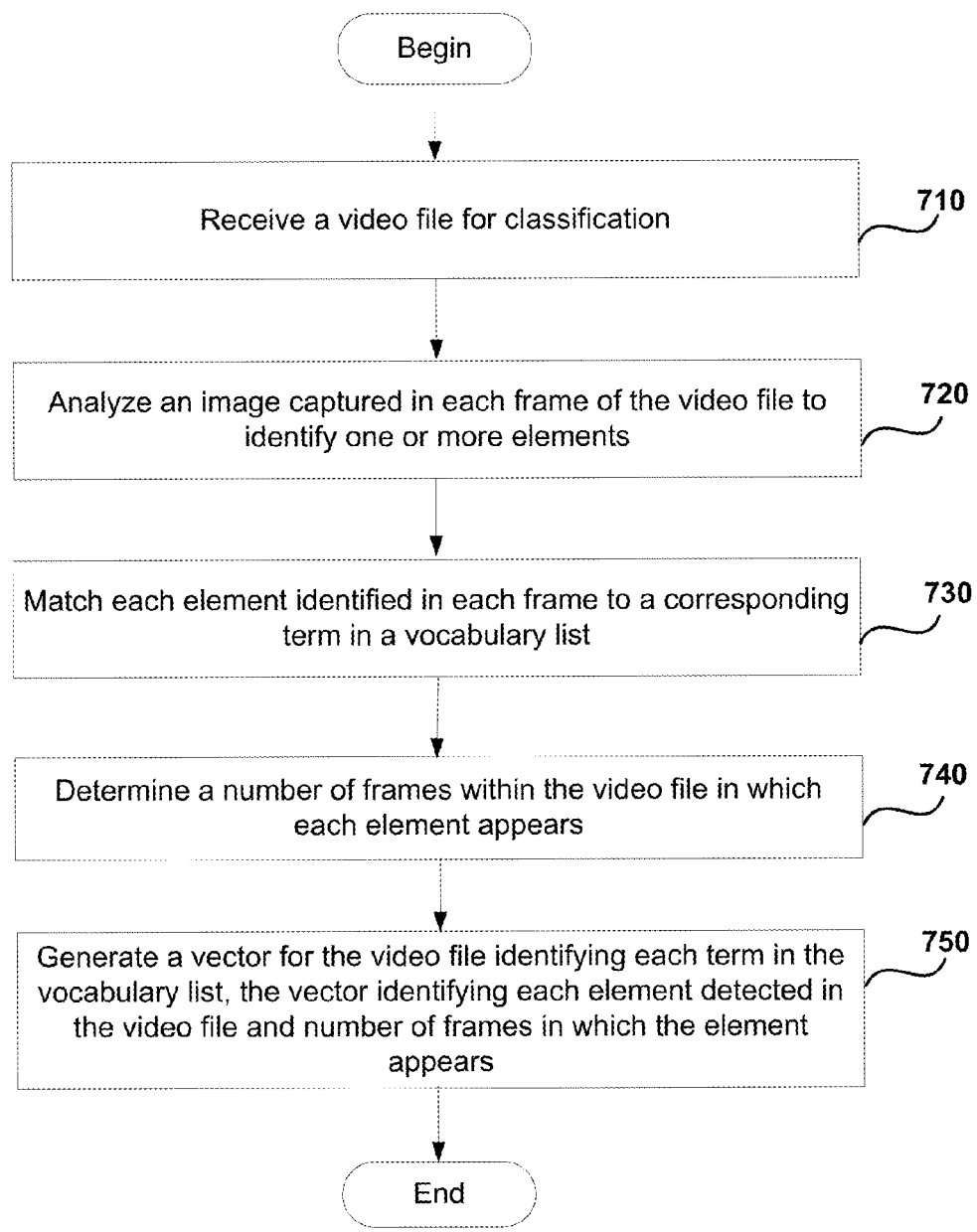
FIG. 7 illustrates a flow chart of process flow operations used for classifying a video file, in accordance with some implementations.

FIG. 7 illustrates process operations of a method for classifying a video file, in some implementations. The method begins at operation 710, wherein a video file is received for classification. The video file could be generated by a content provider and may include editorial content, or may be generated by a user and may include user generated content. An image captured in each frame of the video file is analyzed to identify one or more elements captured within, as illustrated in operation 720. Some of the elements that are identified include objects, actions, scenes, events, etc. Each element identified in the video file is matched to a corresponding term in a vocabulary list, as illustrated in operation 730. A number of frames within the video file, in which each element appears, are determined, as illustrated in operation 740. Where a match is found for an element, a number of frames of the video file in which the element appears are non-zero. When a match is not found for an element, the number of frames of the video file in which the element appears is set to zero. A vector is generated identifying each term in the vocabulary list in a name-value pair, where each name corresponds to an element and value corresponds to the number of frames the element appears in the video file, as illustrated in operation 750. Depending on the exhaustiveness of the vocabulary list used in the matching operation, more or less number of elements may find a match in the vocabulary list. As a result, the vector that is generated for the video file will be sized according to the number of elements that are matched. The vector may also include additional terms that may be inferred from other terms of the video file or include broader terms for specific terms that appear in the vector so as to allow the video to be matched to broader search queries. Sufficient details are provided in the vector to allow indexing of the video file so as to easily identify specific portion of the video file in which a particular element, scene, shot or trigger event occurs. The accurate depiction of the content can be used for matching content to queries, targeting advertisement, comparing content of video file with other media files, etc.

Figure 8:
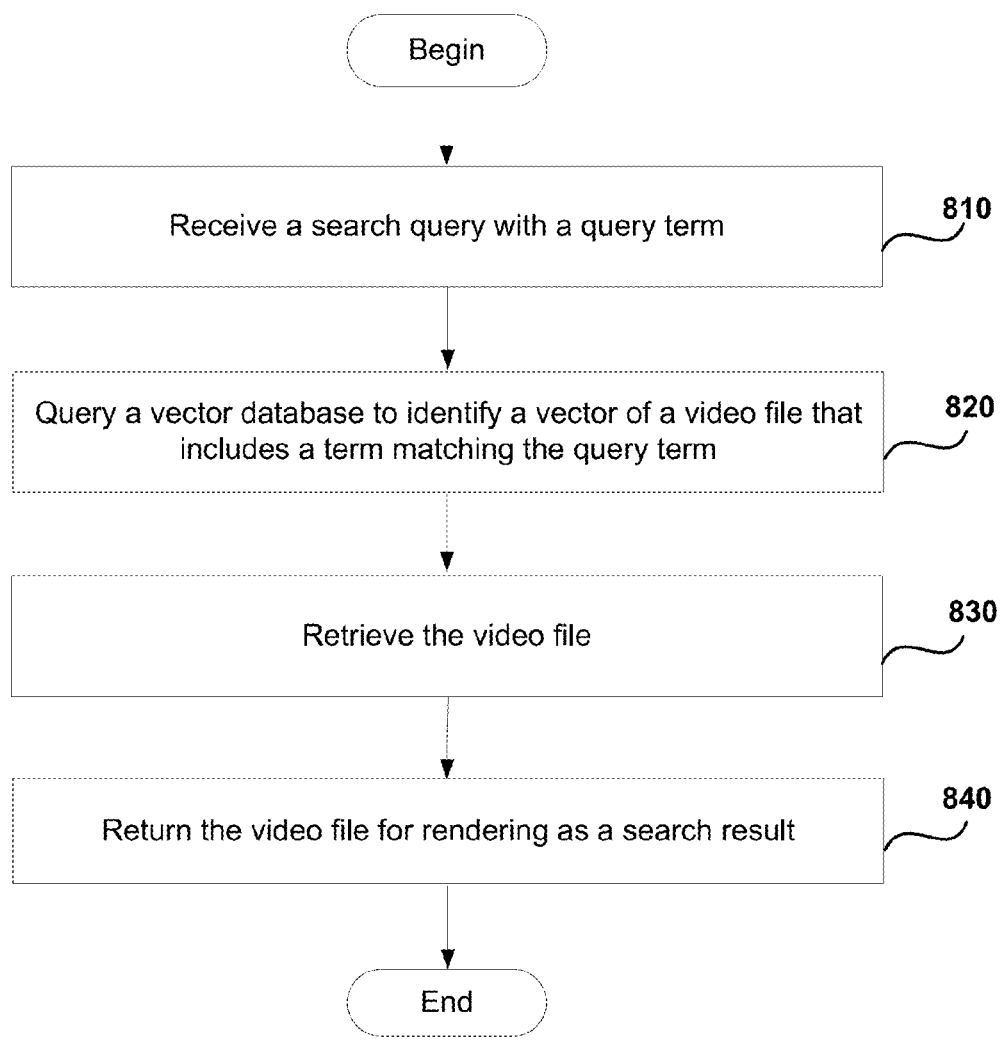
FIG. 8 illustrates flow chart of process operations used for matching query terms to a video file, in accordance with some implementations.

FIG. 8 illustrates method operations for matching a classified video file to a search query, in an alternate implementation. The method begins at operation 810, when a search query is received. The search query includes one or more query terms that need to be matched with one or more documents, articles, files, etc. A query vector is generated for the search query. The query vector is used to query a vector database to identify a vector of a video file that includes a term matching the one or more query terms, as illustrated in operation 820. The vector of the video file identifies each term that appears in a vocabulary list and number of frames in the video file in which a particular element matching to a term in the vocabulary list, appears. The vector is refined to eliminate terms that have zero value in the name-value pair (i.e., terms that do not have a matching element in the video file). The vector may be further refined to eliminate terms that have confidence score that fall below a pre-defined threshold value. The query vector is matched to the refined vector of each video file in the vector database. Matching of the query vector to the vector of the video file includes matching query terms defined in the query vector to terms defined in the vector of each video file.

When a match of the query vector is found in a video file, the video is retrieved, as illustrated in operation 830, and returned for rendering as a search result, as illustrated in operation 840. The entire video file or a link to the video file may be returned in response to the search query or a portion of the video file that includes the query term may be returned. The portion of the video file may be identified from the indexing information provided in the vector.

The various implementations described herein allow content of a video file to be represented in textual format so that the video file can be searched and matched like a text document. The textual representation of content allows for more precise advertisement targeting by allowing the advertisement to be inserted in precise location where it is more relevant. Representing the video file in text format using a Vector Space Model enables the video file to be easily searched and matched with other media files, such as text files, image files, video files, etc. The vector representation is unambiguous, language independent, and can be designed for specific product-oriented application. The richer or more extensive the vocabulary list used in classifying the video file, the more detailed the description will be of the content of the video file defined by the vector. The more detail that is captured in the vector, the greater the chance that the video file will be "recognizable" from the descriptive vector (i.e., the more accurately the video file will be described). The vector representation provides more meaningful representation of the content than what is provided in the metadata. It enables precise advertisement targeting as it allows targeting only to those users whose profiles or interests match the product the advertisement advertises.

With the above implementations in mind, it should be understood that the disclosure could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing implementations have been described in some detail for purposes of clarity of understanding, it will be apparent that certain changes and modifications can be practiced within the scope of the appended claims. Accordingly, the various implementations described herein are to be considered as illustrative and not restrictive, and the implementations are not to be limited to the details given herein, but may be modified within the scope and equivalents of the appended claims.

What is claimed is:

1. A method, comprising:
   receiving a video file for classification;
   analyzing images captured in frames of the video file to identify one or more elements;
   matching each element of the one or more elements identified in the images of frames to a corresponding term defined in a vocabulary list;
   determining a number of frames within the video file in which each element appears, which corresponds to the term in the vocabulary list; and
   generating a vector for the video file, the vector identifying each term in the vocabulary list, the vector represented in textual format as a name-value pair, wherein name in the name-value pair corresponds to the name of the term in the vocabulary list, and value in the name-value pair corresponds to the number of frames within the video file in which each element appears, which corresponds to the term in the vocabulary list, information provided in the vector used to identify one or more frames where the respective element is detected in the video file.

2. The method of claim 1, wherein each element identifies at least one of an object, an action, a scene, or an event.

3. The method of claim 1, wherein analyzing further includes
   selecting a subset of frames of the video file, wherein the subset includes a sampling of one or more frames selected at periodic intervals from the video file; and
   analyzing the image captured in the frames within the subset to identify the one or more elements.

4. The method of claim 1, further includes,
   computing a confidence score for each element identified in the images of the frames in the video file; and
   refining the vector to filter out select ones of the one or more elements having the confidence score that is below a pre-defined threshold value.

5. The method of claim 1, wherein generating the vector further includes,
   identifying a related term for the term that matches with the element identified within the video file; and
   including the related term in the vector generated for the video file, the name of the name-value pair corresponds to the name of the related term and the value corresponds to the number of frames of the element that matches with the term.

6. The method of claim 5, wherein the related term is at least one of a hypernym, a holonym, or a meronym of the term.

7. The method of claim 1, wherein analyzing an image further includes,
   examining each of the one or more elements identified in the images of the frames to determine relative relevance of the element to a context captured in the respective ones of the images; and
   adjusting the one or more elements identified in the frames of the video file, based on the relative relevance of each of the one or more elements.

8. The method of claim 1, wherein the vector is a one-dimensional vector.

9. A system, comprising:
   a server computing device having a memory to store a video classification algorithm and a processor to execute logic of the video classification algorithm, the server computing device receives a video file and processes the video file using the video classification algorithm, wherein the video classification algorithm includes,
   an image analyzer to examine images captured in frames of the video file to identify one or more elements;
   a classifier to match the one or more elements identified in the images of the frames to corresponding terms within a vocabulary list and to determine a number of frames within the video file in which each element appears, which corresponds to a term in the vocabulary list; and
   a vector generator to generate a vector for the video file identifying each term in the vocabulary list, the vector is represented in textual format as a name-value pair, wherein name in the name-value pair corresponds to the name of the term in the vocabulary list, and value in the name-value pair corresponds to the number of frames within the video file in which each element appears, which corresponds to the term in the vocabulary list, information provided in the vector used to identify one or more frames where the respective element is detected in the video file.

10. The system of claim 9, further includes,
    a confidence analyzer to compute a confidence score for each element identified in the images of the frames, the confidence score used in adjusting the vector so as to exclude the elements whose confidence score is less than a pre-defined threshold value.

11. The system of claim 9, further includes one or more lexical resources for identifying a related term for the term that matches with the element identified in the video file, the related term included in the vector generated for the video, wherein the name in the name-value pair corresponds to the related term and the value corresponds to the number of frames of the element that matches with the related term.

12. A method, comprising:
    receiving a search query with a query term;
    querying a vector database to identify a vector of a video file that includes a term matching the query term of the search query, information provided in the vector includes an index to identify the term and a number of frames of the video file where an image of an element matching the term appears,
    wherein the vector identifies each term in a vocabulary list that is used to match elements identified in images of frames of the video file, the vector being represented in textual format as a name-value pair, wherein name in the name-value pair corresponds to a name of the term in the vocabulary list and value in the name-value pair corresponds to the number of frames within the video file in which the element from the elements appears, which corresponds to the term in the vocabulary list;

retrieving the video file; and returning the video file with the index as a search result for the search query.

13. The method of claim 12, wherein the vector is a one-dimensional vector.

14. The method of claim 12, wherein the related term is one of a hypernym, holonym or a meronym of the term.

* * * * *